May 10, 1932. H. HUBBELL, JR 1,857,378
BASEBOARD WIRING DEVICE
Filed Aug. 17, 1928
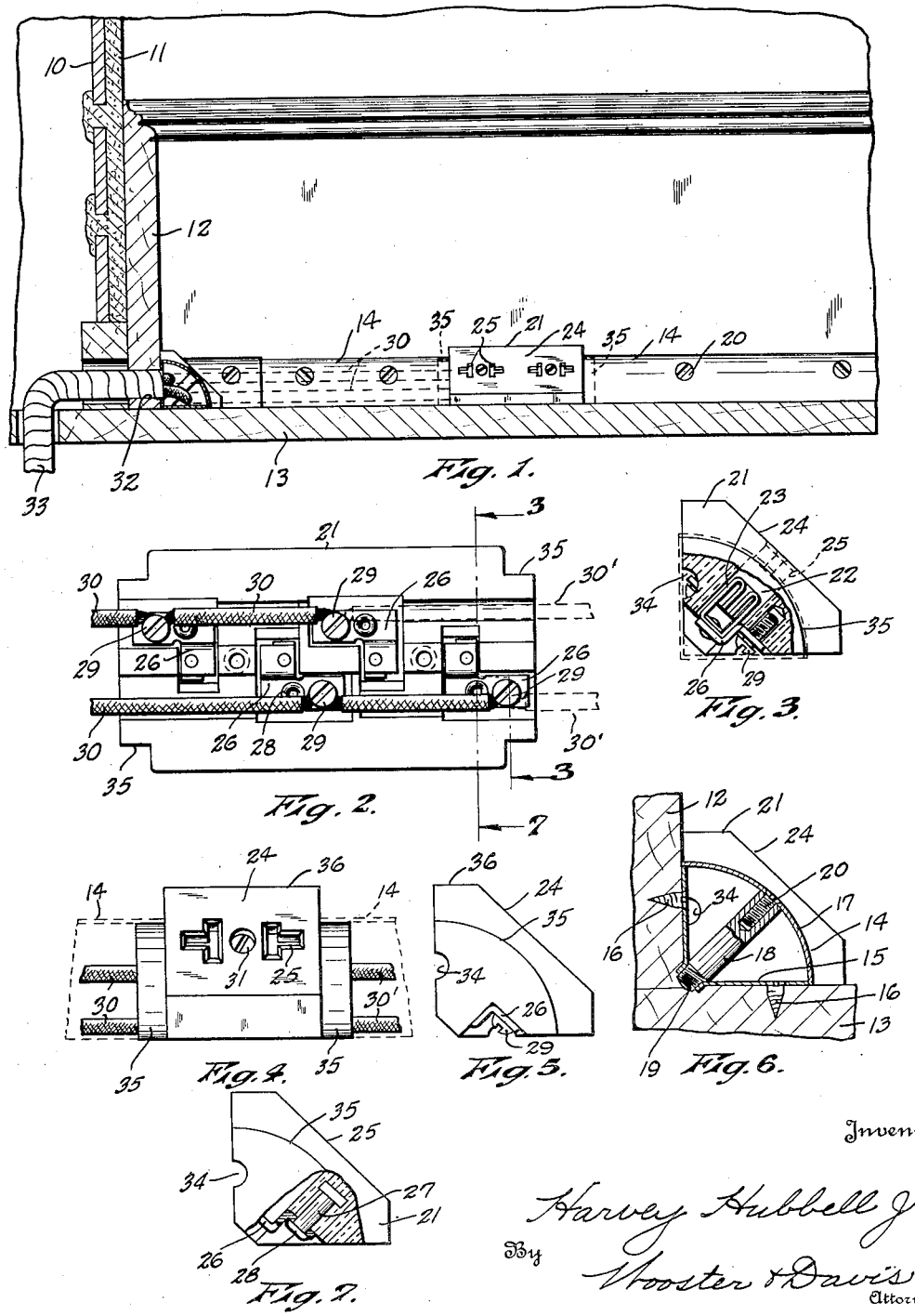
Inventor
Harvey Hubbell Jr.
By Wooster & Davis
Attorneys.

Patented May 10, 1932

1,857,378

UNITED STATES PATENT OFFICE

HARVEY HUBBELL, JR., OF BRIDGEPORT, CONNECTICUT

BASEBOARD WIRING DEVICE

Application filed August 17, 1928. Serial No. 300,369.

This invention relates to a wiring device particularly adapted for mounting at the corner between the baseboard and the floor to provide extra outlet receptacles.

It very often happens that in wiring a house there are not sufficient electrical outlets provided, and if they are installed later they require that portions of the baseboard be cut away to provide space for the mounting of a wall outlet box, and the mounting of these boxes and making connections may be quite expensive, and the wall structures and woodwork may be considerably cut up.

It is an object of my invention to provide a construction which may be quickly and easily installed without the necessity of cutting away the walls or woodwork to provide space for the wall outlet box and in which these boxes are not required.

It is a further object of the invention to provide construction of this type in which practically any desired number of outlet receptacles may be easily and quickly provided.

With the foregoing and other objects in view, the invention consists in certain novel features of construction, combinations and arrangements of parts as will be more fully described in connection with the accompanying drawings. In these drawings, Fig. 1 is a section of the wall and floor showing my improved wiring device installed.

Fig. 2 is a rear elevation of a double receptacle.

Fig. 3 is a partial section and a partial end elevation of the receptacle, the section being substantially on line 3—3 of Fig. 2.

Fig. 4 is a front elevation of a single receptacle.

Fig. 5 is an end view thereof.

Fig. 6 is a transverse section of my improved molding and a portion of the wall, and Fig. 7 is a partial end elevation and partial section substantially in a plane indicated at 7 in Fig. 2.

Referring to Fig. 1, a portion of the side wall of the room is shown in section including the lathing and plaster 11 with the baseboard 12 next to the floor 13. My improved wiring device is especially adapted for mounting in the corner between the baseboard and floor although it is not necessarily limited to use in this location. It comprises a hollow metal, preferably quarter round, molding 14 which may be drawn as a continuous tube or it may be made in two sections an inner angular sheet metal section 15 to fit into the corner and secured to the baseboard of the floor 11 by suitable screws 16 and an outer curved section 17 closing the open side of the section 15, thus making what is in effect a closed conduit for the lead wires connected to the house wiring system. The outer member 17 may be secured in various ways, a simple means being shown in Fig. 6, in which a stud 18 is threaded at its inner end 19 into a suitably tapped opening in the inner member 15 and has a threaded socket at its outer end to receive a screw 20 passing through the outer section 17. Any number of these securing devices may be employed suitably spaced throughout the length of the molding as is found desirable.

Associated with this molding are the receptacles for plugging in of the attachment plug caps on the flexible leads from the electrical devices to be operated. These may be either single or double receptacles as desired, both forms being shown on the drawings. The double receptacle shown in Figs. 1, 2 and 3 comprises a body member 21 of insulating material having two rear walls arranged at substantially right angles to each other so that this body member may be seated in the angle between the baseboard and floor, and it has suitably spaced compartments or recesses 22 in which are mounted spring contacts 23 for engaging the knife blade contacts of the standard attachment plug caps, the front wall 24 of the body being provided with slots 25 leading to the chambers 22 for passage of these knife blade contacts. It is preferred that the front wall 24 be inclined substantially as shown to give a more attractive appearance and prevent accumulation of dust and dirt. The spring contacts 23 are mounted on suitable mounting plates 26 secured to the body by any suitable means, such as eyelets or rivets 27, molded in the material in the body and extending at their outer ends through openings in these plates and riveted, over as shown at 28. These plates carry binding post screws 29 by means of which the lead wires 30 from the house wiring system may be attached to the receptacle contacts. The receptacle may be secured in position by screws 31 passing therethrough.

In mounting this receptacle it is not necessary to cut out a section of the wall, all that is necessary is to bore a hole, such as indicated at 32, through the baseboard and draw up a section of the BX cable 33 connected to the house wiring system. The lead wires 30 from this cable are conducted through the metal molding 14 and connected to the various receptacles by means of the binding post screws 29. If more than one receptacle is installed the leads are connected to the binding posts of one receptacle and conducted through the intermediate molding to the next receptacle, as indicated at 30', and the rear wall of the receptacle body may be provided with longitudinal grooves 34 to accommodate these leads as well as the leads 30.

It will be noted from Fig. 1 that the receptacle is mounted between two adjacent sections of the molding or conduit 14, and to provide a neat and tight connection the opposite ends of the body of the receptacle are provided with an extension 35 shaped to fit within the open ends of the adjacent sections of the molding. Thus the molding assists in holding the receptacle in position and this arrangement makes a connection between the molding and the receptacle which will prevent entrance of dirt.

It will be apparent that with this construction practically any desired number of receptacles may be easily and quickly installed without the necessity of cutting away the woodwork. In Fig. 4 is shown a single receptacle 36, but this is in all respects similar to the double receptacle shown in Figs. 1 and 2 except that it has only one set of contacts, and therefore, is capable of receiving only one attachment plug cap instead of two as the form shown in Figs. 1 and 2.

Having thus set forth the nature of my invention what I claim is:

1. In a wiring device of the character described, a hollow molding to fit in the corner between two walls, a receptacle comprising an insulating body to be inserted between two sections of said molding, said body having an extension at each of its ends, said extensions shaped to fit within the adjacent end portions of two sections of said molding and be held thereby, spring contacts mounted on said body, and means for connecting lead wires in said molding to said contacts, said body being provided with knife blade contact openings in its front wall leading to said contacts to receive the blade contacts of an attachment plug cap.

2. In a device of the character described, a receptacle having a body member of insulating material of a shape generally triangular in cross-section to provide bottom and rear walls placed at an angle to each other to set in the corner between a baseboard and floor and an inclined front wall, spring contacts mounted in said body, said front wall being provided with knife blade slots leading to said contacts to receive the blade contacts of an attachment plug cap to engage the spring contacts, and means for connecting lead wires to said contacts.

3. In a device of the character described, a receptacle including a body member of insulating material of a shape generally triangular in cross section having two rear walls arranged at an angle to each other and an inclined front wall, spring contacts mounted in the body member, means for connecting lead wires to said contacts, said body being provided with knife blade slots in its front wall leading to said contacts, said rear walls each having a longitudinal channel for the lead wires, whereby the lead wires will extend into and out of the receptacle through said channels and said channels will be closed on the receptacle being inserted into the corner between a baseboard and a floor with its inclined front facing forwardly.

4. In a device of the character described, a receptacle including an insulating body member having a pair of longitudinally extending rear walls arranged at an angle to each other and an inclined front wall, spring contacts mounted in the body, means for securing lead wires to said contacts, the front wall of the body being provided with knife blade slots leading to said contacts, and the rear walls of the body being provided with longitudinal channels leading from its opposite ends for said lead wires whereby said lead wires extend longitudinally through the receptacle and will be held in said channel on the receptacle being mounted in a corner.

5. In a device of the character described, a receptacle including an insulating body member having a pair of longitudinally extending rear walls arranged at an angle to each other and an inclined front wall, spring contacts carried by said body, means for securing lead wires to said contacts, said front wall being provided with knife blade slots leading to said contacts, and extensions on the opposite ends of the body shaped to fit into the adjacent open ends of sections of hollow molding.

6. In a device of the character described, a receptacle including an insulating body member having a pair of longitudinally extending rear walls arranged at an angle to each other and provided with recesses, spring contacts mounted in said recesses, means for connecting lead wires to said contacts, said body being provided with an inclined front wall having knife blade slots leading to said recesses, and curved extensions at the opposite ends of the body shaped to extend into the adjacent open ends of sections of hollow molding.

7. In a device of the character described, a receptacle having a body member of insulating material of a shape generally triangular in cross-section to provide rear walls placed at an angle to each other to set in the corner between a baseboard and floor and an inclined front wall, contact chambers extending through the body to said rear walls, contacts mounted in said chambers and said front wall being provided with knife blade slots leading to said contacts to receive the blade contacts of an attachment plug cap to engage the contacts in the chamber.

8. In a device of the character described, a receptacle having a body member of insulating material of a shape generally triangular in cross-section to provide rear walls placed at an angle to each other to set in the corner between a baseboard and floor and an inclined front wall, contact chambers extending through the body to said rear walls, contacts mounted in said chambers, said front wall being provided with knife blade slots leading to said contacts, said rear walls being recessed adjacent said chambers and means in said recesses for connecting lead wires to said contacts, to receive the blade contacts of an attachment plug cap to engage the contacts in the chambers.

9. In a device of the character described, a receptacle having a body member of insulating material of a shape generally triangular in cross-section to provide rear walls placed at an angle to each other to set in the corner between a baseboard and floor and an inclined front wall, contact chambers extending through the body to said rear walls, contacts mounted in said chambers, said front wall being provided with knife blade slots leading to said contacts, said rear walls being recessed adjacent said chambers and means in said recesses for connecting lead wires to said contacts, said rear walls being longitudinally channelled to receive lead wires whereby they fit between the receptacle and the baseboard and floor and are held in the channels by the baseboard and floor when the receptacle is in place.

In testimony whereof I affix my signature.
HARVEY HUBBELL, Jr.